United States Patent
Natsubori et al.

(10) Patent No.: US 6,449,514 B1
(45) Date of Patent: Sep. 10, 2002

(54) APPARATUS AND METHOD FOR NETWORK INTEGRATED MANAGEMENT

(75) Inventors: Shigeyasu Natsubori, Kanagawa-ken; Toshiya Takahashi, Chiba-ken; Tatsuya Zettsu, Kanagawa-ken; Toru Imai, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/395,611

(22) Filed: Sep. 14, 1999

(30) Foreign Application Priority Data

Sep. 14, 1998 (JP) .......................................... P10-260525

(51) Int. Cl.⁷ ............................................... G05B 11/01
(52) U.S. Cl. ............................. 700/19; 700/17; 340/825
(58) Field of Search .............................. 700/19, 17, 83; 340/825

(56) References Cited

U.S. PATENT DOCUMENTS 5,086,385 A * 2/1992 Launey et al. ................. 700/83
5,088,045 A * 2/1992 Shimanaka et al. .......... 700/110
5,922,047 A * 7/1999 Newlin et al. ............... 709/217
6,148,241 A * 11/2000 Ludtke et al. ................. 700/83
6,314,326 B1 * 11/2001 Fuchu ........................... 700/17

* cited by examiner

Primary Examiner—Leo Picard
Assistant Examiner—Zoila Cabrera
(74) Attorney, Agent, or Firm—Oblon, Spivak, McClelland, Maier & Neustadt, P.C.

(57) ABSTRACT

An integrated network management and apparatus for managing devices connected to a network which have the same function. Control modules prepare local management tables by reading information regarding recordings made on respective recording media of the devices, and an integrated control module communicates with the control modules to prepare an integrated management table by reading the local management tables. The integrated management table enables the integrated control module to recognize a correlation between a recorded program and the control module, recording medium and recording position. The integrated control module also controls the control modules in the respective devices in an integrated manner using the integrated management table.

27 Claims, 13 Drawing Sheets

| PROGRAM ID | RELATED INFORMATION | POINTER |
|---|---|---|
| 26579 | 1998/06/20,19:00-:19:30,11ch,ECONOMIC NEWS | 01120230 |
| 96156 | 1998/06/20,20:55-:20:57,21ch,WEATHER IN YOKOHAMA | 02350425 |
| 35948 | | 01290305 |

INTEGRATED MANAGEMENT TABLE

| POINTER | ADDED INFORMATION | RECORDING POSITION |
|---|---|---|
| 120250 | 1998/06/20,19:00-:19:30 | 22265233 |
| 290305 | 1998/06/20,20:55-:20:57 | 57862983 |
| 435948 | | 02648362 |

LOCAL MANAGEMENT

37

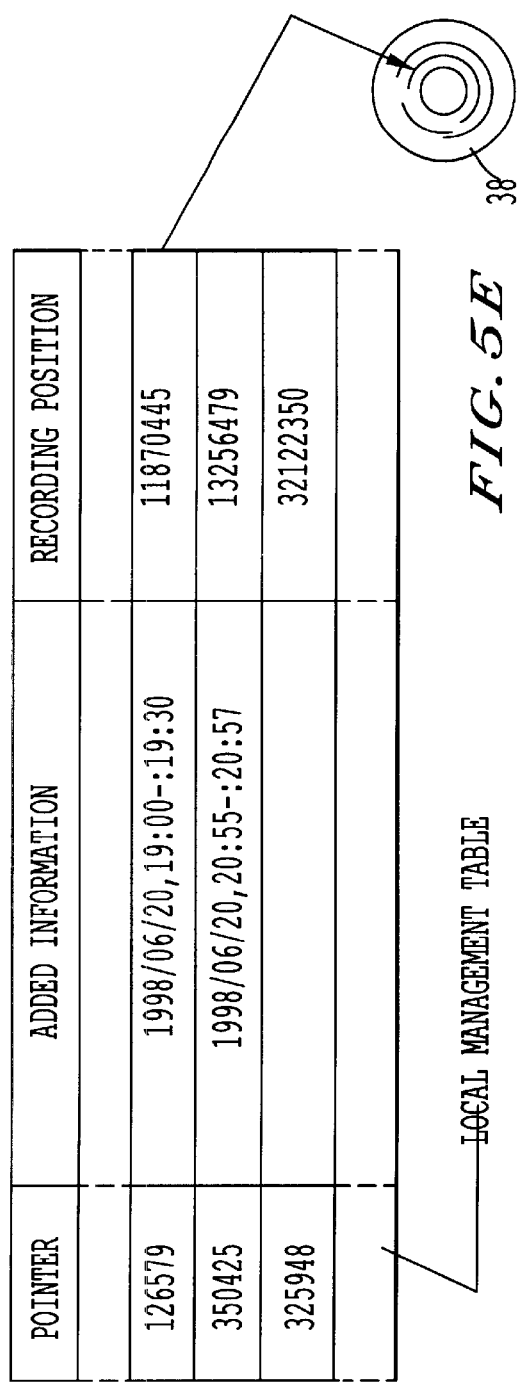

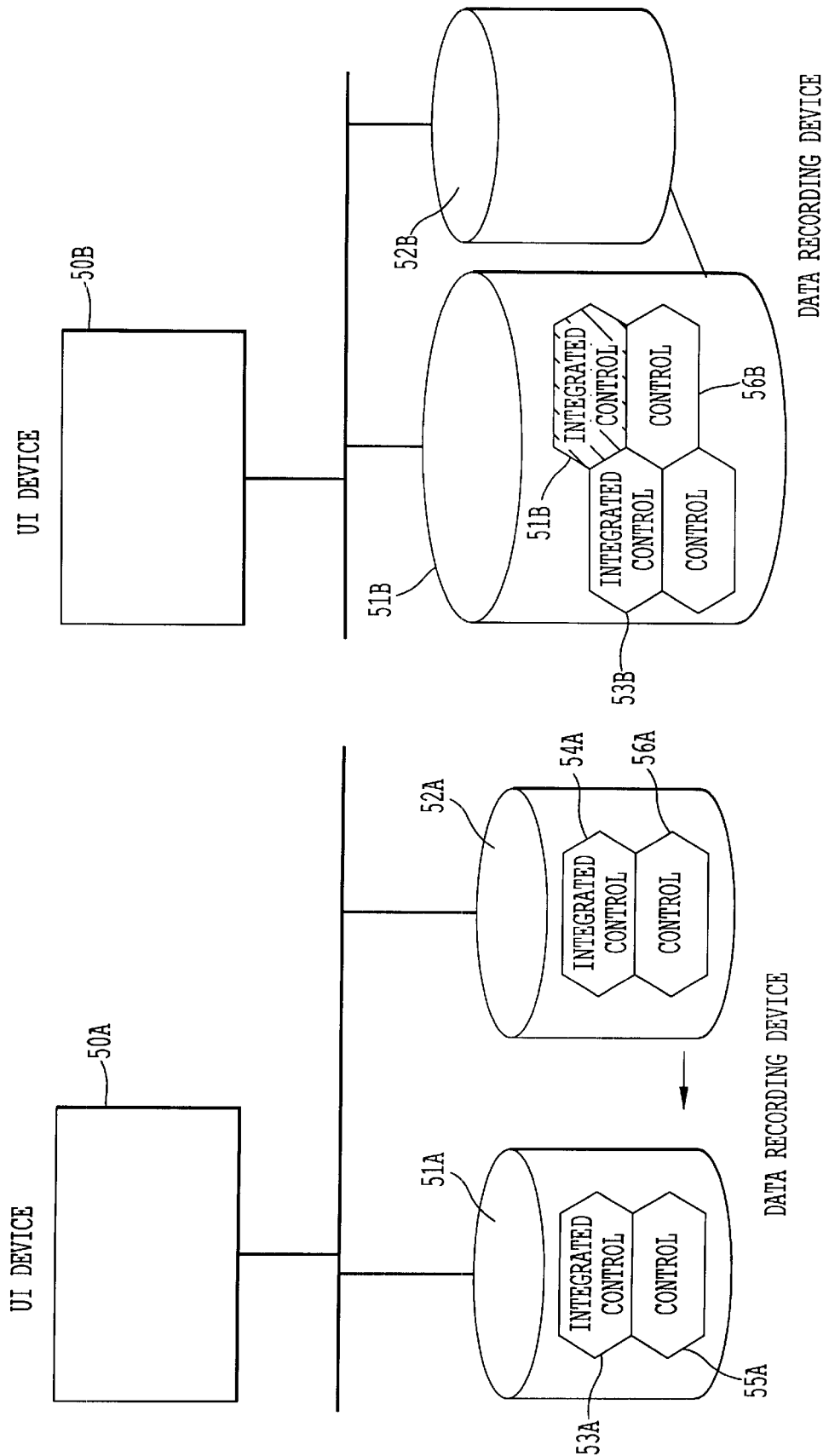

APPARATUS AND METHOD FOR NETWORK INTEGRATED MANAGEMENT

CROSS-REFERENCE TO RELATED APPLICATION

This application claims priority to Japanese Application No. P10-260525 filed on Sep. 14, 1998, which is incorporated herein by reference.

BACKGROUND OF THE INVENTION

1. Field of the Invention

The present invention relates to a network integrated management apparatus and method for managing a plurality of devices connected to a network in an integrated manner.

2. Description of the Related Art

The development of technology for connecting a plurality of household electrical devices to form a home network has recently begun. For example, a network utilizing IEEE (The Institute of Electrical and Electronics Engineers, Inc.) 1394, which is becoming widespread as a digital interface adaptable for multimedia, has been developed.

IEEE 1394 is a serial bus which has a wide bandwidth and is suitable for transferring a large data stream such as video and audio, and therefore has received attention as a home network bus. Also, IEEE 1394 has an asynchronous transfer function to ensure the transfer of video and audio data, etc., within a certain period of time, and serves as a digital interface suitable for image transmission.

A VCR (Video Cassette Recorder) is often connected to such a network to record a data stream flowing on a network bus. In this case, the user records a broadcasting program, for example, by separately controlling individual devices, such as a set-top box, to receive a desired broadcasting program and record a data stream corresponding to the broadcasting program on the VCR. The user must also control the VCR, which is connected to the network, to record the data stream of the received broadcasting program transmitted from the set-top box.

Further, when a plurality of VCRs are connected on a network, it is possible to continuously record a long-duration program that exceeds a recording time of an ordinary video cassette. The operation for recording such a program is similar to the case of recording with a single VCR, but instead the user separately controls the respective VCRs and designates a recording time, a recording position in a tape, etc., for each VCR. That is, even with a plurality of VCRs, a set-top box and so on connected to a network, the user has to separately control each device to record or reproduce data. The user also has to determine the status of the respective VCRS by individually checking the devices. Furthermore, the user is also required to separately manage the respective video tapes included in the VCRs. For example, the user must paste labels including the program's title, etc., to the corresponding video tapes. In addition, similar separate control operations are required to reproduce data previously recorded.

The contents of data recorded on a video tape may be stored in a memory provided in the VCR or in a memory in a video cassette. However, even in this case, the management must be performed in units of video tapes, namely by separately managing the individual video tapes.

Moreover, the user is required to separately check each video tape to determine if the tape has a sufficient capacity (i.e., the amount remaining unrecorded). In other words, the user must visually confirm the unrecorded amount of a video tape, or must insert a video tape into a VCR and confirm the remaining amount of the tape by using a function of the VCR which indicates the capacity left on the tape, for example.

Accordingly, the user is required to search unrecorded portions of the respective tapes and designated recording positions in the respective tapes to record a lengthy program. Further, the user must separately operate the plurality of VCRs so that the VCRs record the program in succession. Thus, the user-made operation is extremely time consuming.

When a random accessible disk, such as a CD-ROM or DVD-RAM is used as a recording medium and time-serial data such as video and audio data is recorded on the disk, the recording operation is generally managed using an authoring tool or the like so that one program is recorded on one medium. When a long-duration program is recorded on a plurality of recording media, a label indicating which part of the program is recorded on the medium, is placed on the surface of each of the recording media. Thus, using the labels, the user can continuously reproduce the program in a correct order from the plurality of recording media. In such a case, the user also must separately operate a plurality of devices to record and reproduce data, and must manage information regarding the contents of data recorded on the individual media.

Recently, eight electrical manufacturers in Japan and Europe have proposed a specification called HAVi (Home Audio/Video interchangeability) to provide interchangeable operation between household electrical devices included in a home network. The HAVi specification specifies a device control module (referred to as a DCM hereinafter), and an application program controls the device through the DCM. That is, according to the HAVi specification, an application program controls the DCM of each device. In this case, however, the application program controls the devices separately, and when a recording and reproduction operation are performed in cooperation with a plurality of devices, the required processing is very complicated.

Thus, in the past, devices connected to a network have to be controlled separately, as well as the recording media used with the devices. This requires the user to perform a time-consuming and troublesome operation.

SUMMARY OF THE INVENTION

Accordingly, one object of the present invention is to provide an apparatus and a method for network integrated management in which a plurality of devices connected to a network are managed in an integrated manner so that the plurality of devices may be used in a cooperating manner with a simple operating process.

Another object of the present invention is to provide an apparatus and a method for network integrated management in which, even when a new device is added to, or removed from a network, the new configuration of devices may be managed in an integrated manner.

To achieve these and other objects, the present invention provides an apparatus for managing a plurality of devices connected together via a network. The apparatus includes control units respectively provided in the plurality of devices and at least one integrated control device provided on the network in order to control the control units in devices, which have a same function, in an integrated manner based on integrated management information read from the information acquired from the plurality of control units. In addition, the control units perform functions of the device and acquire information necessary to perform the functions.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

Figure 3:
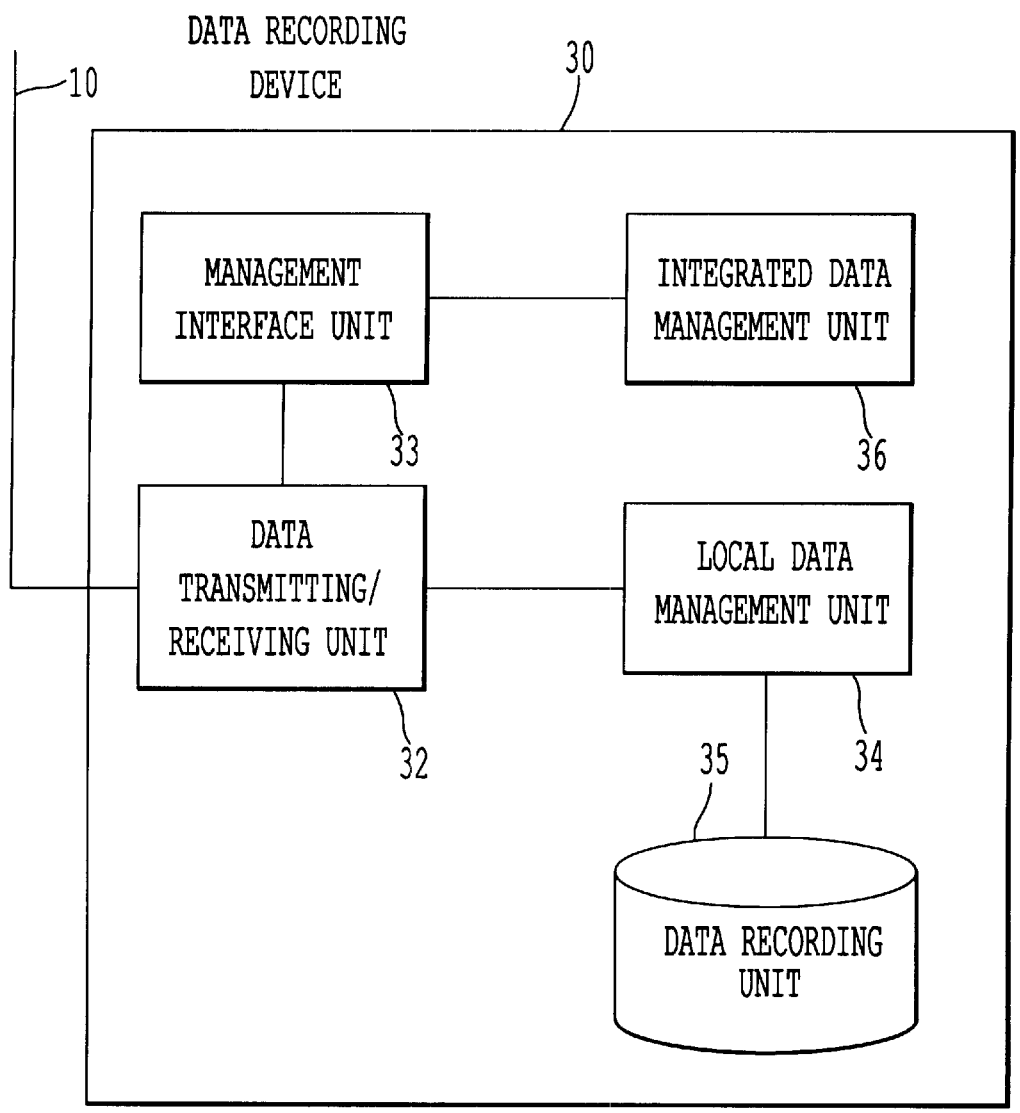
FIG. 3 is a block diagram showing another embodiment of the present invention.
Figure 7B:
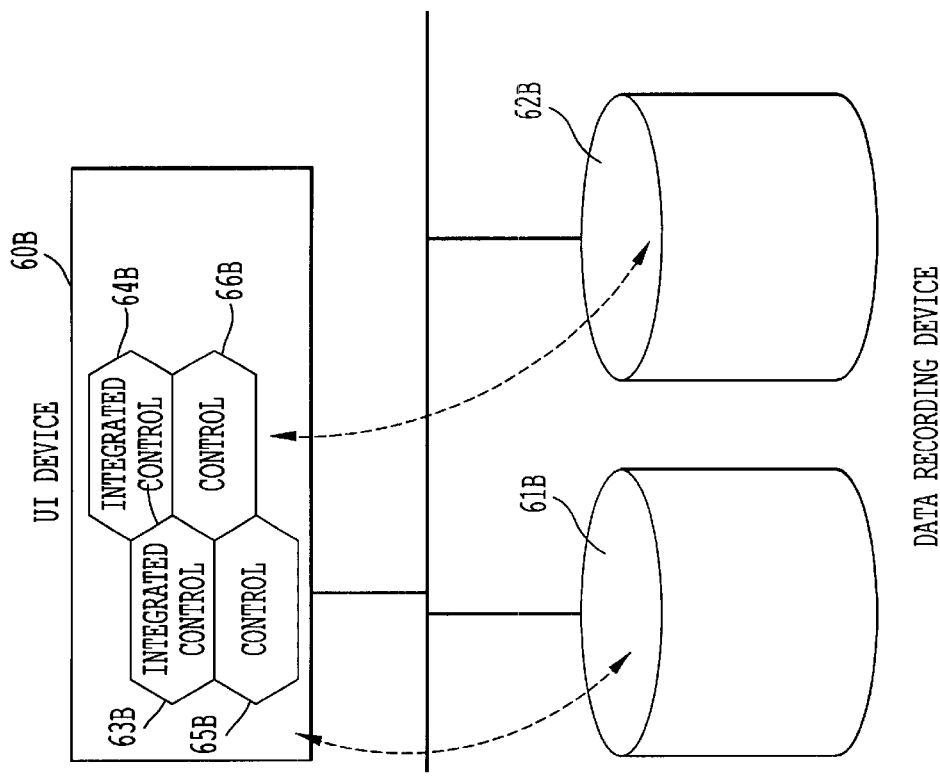
Figure 7A:
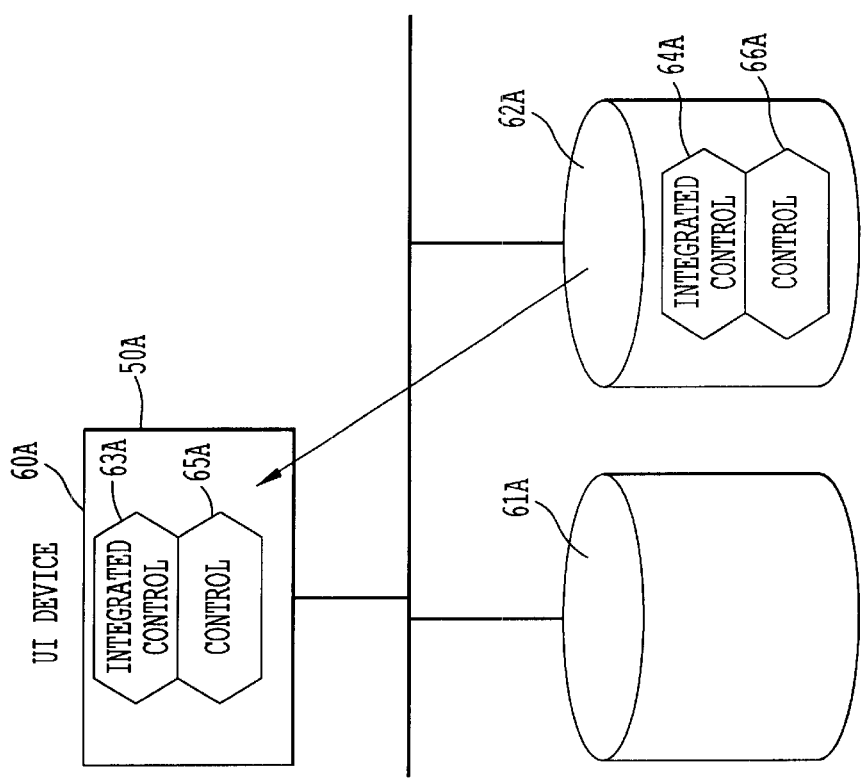
Figure 8:
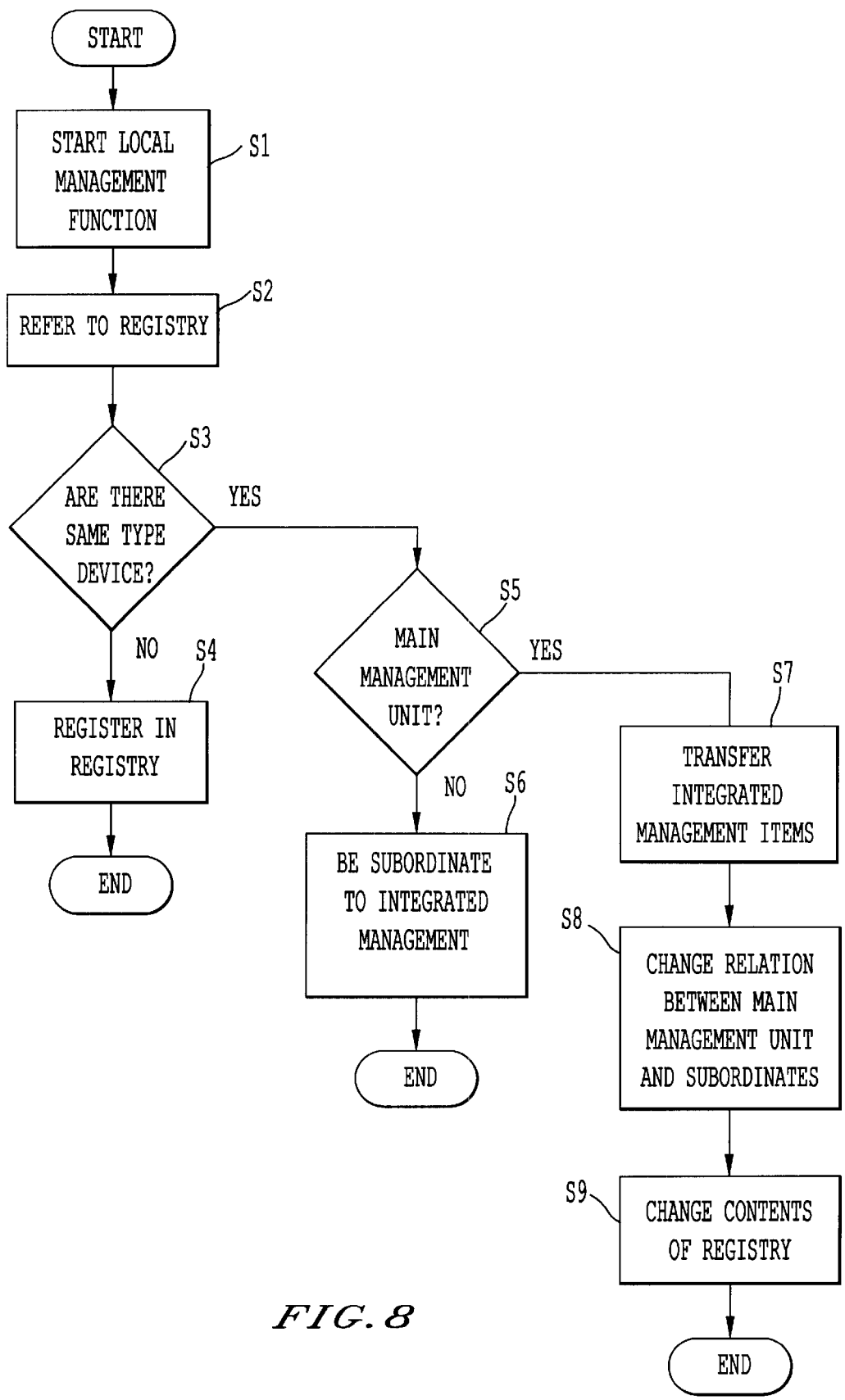
Figure 9:
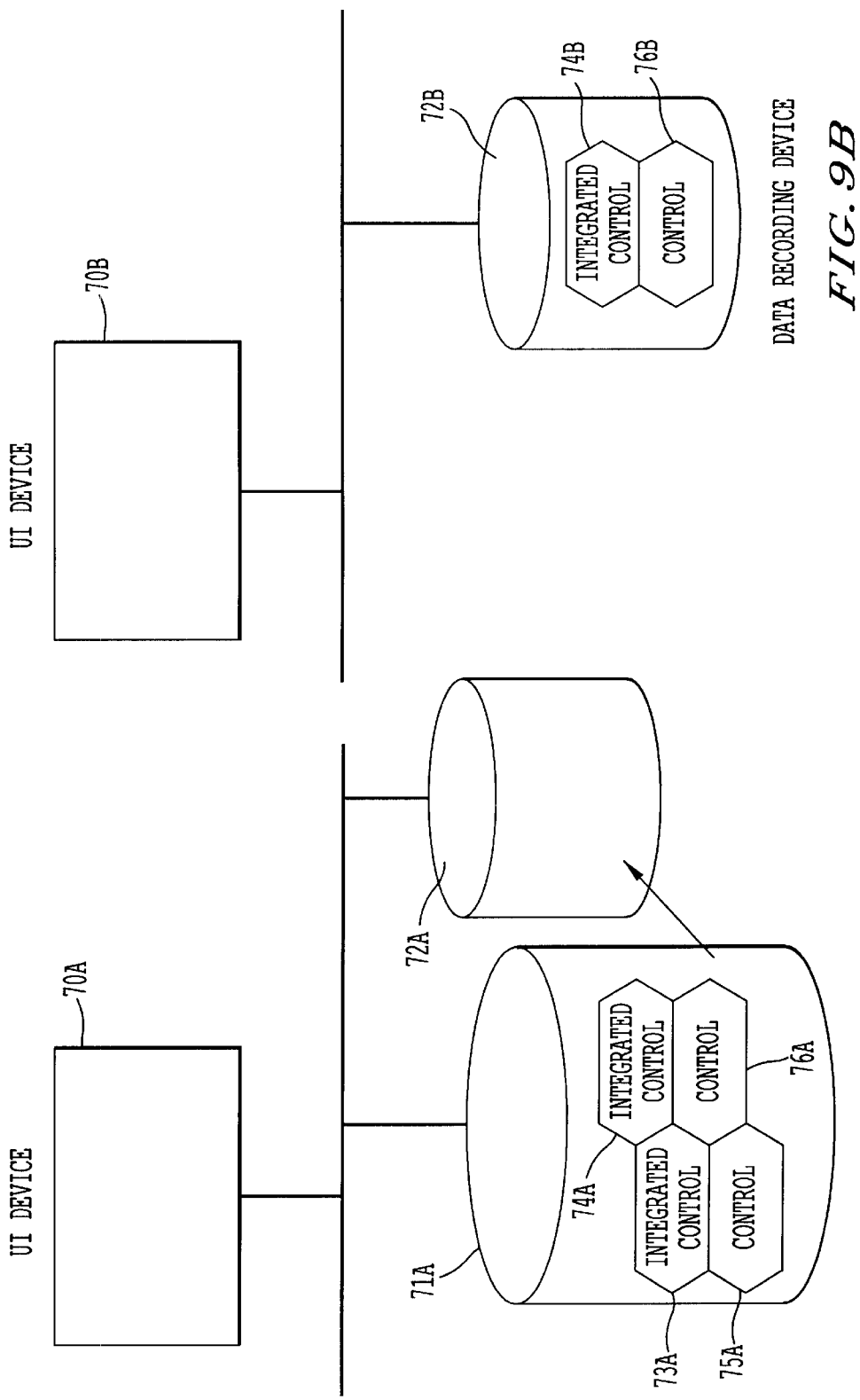
Figure 10:
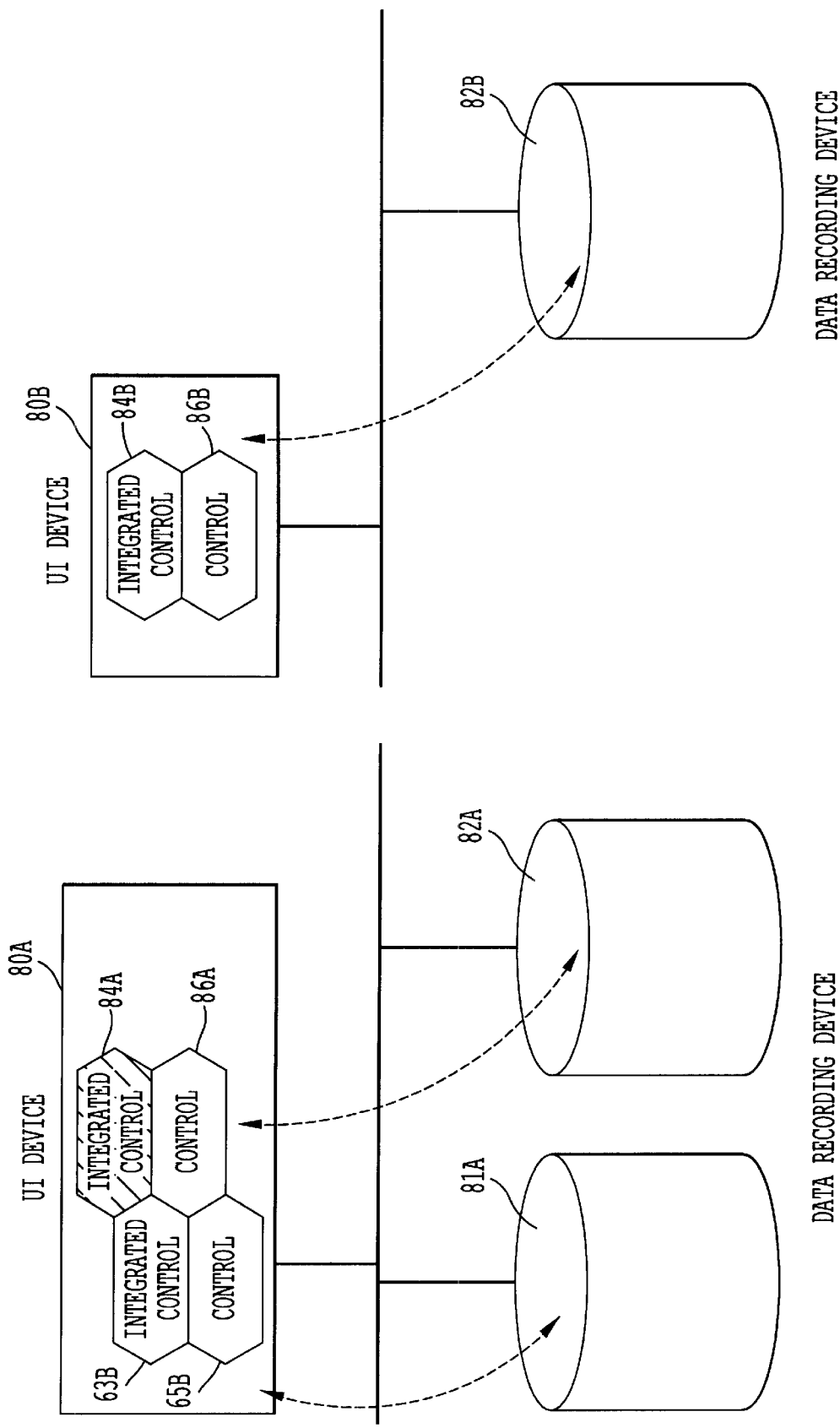
Figure 11:
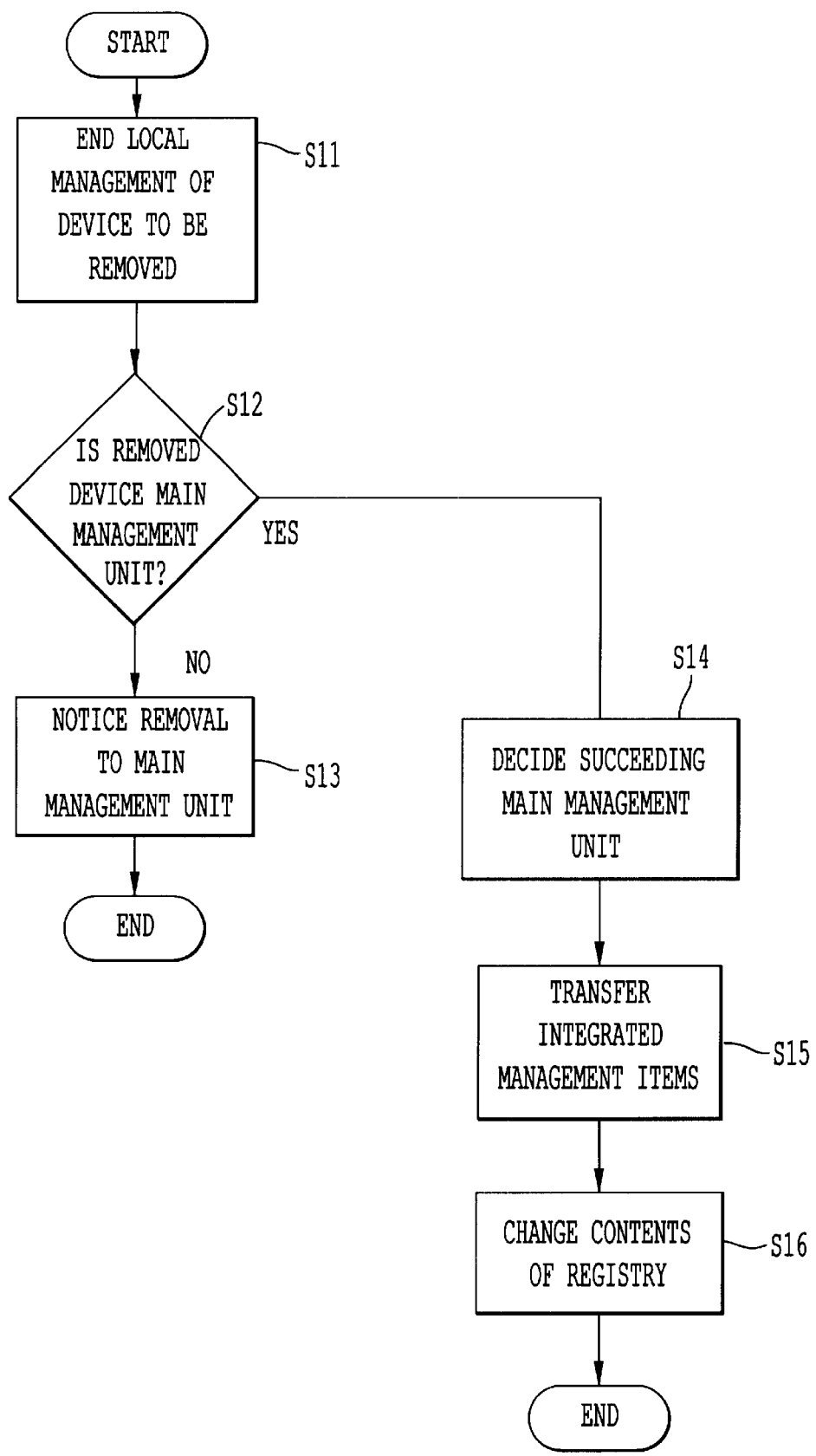
Figure 12:
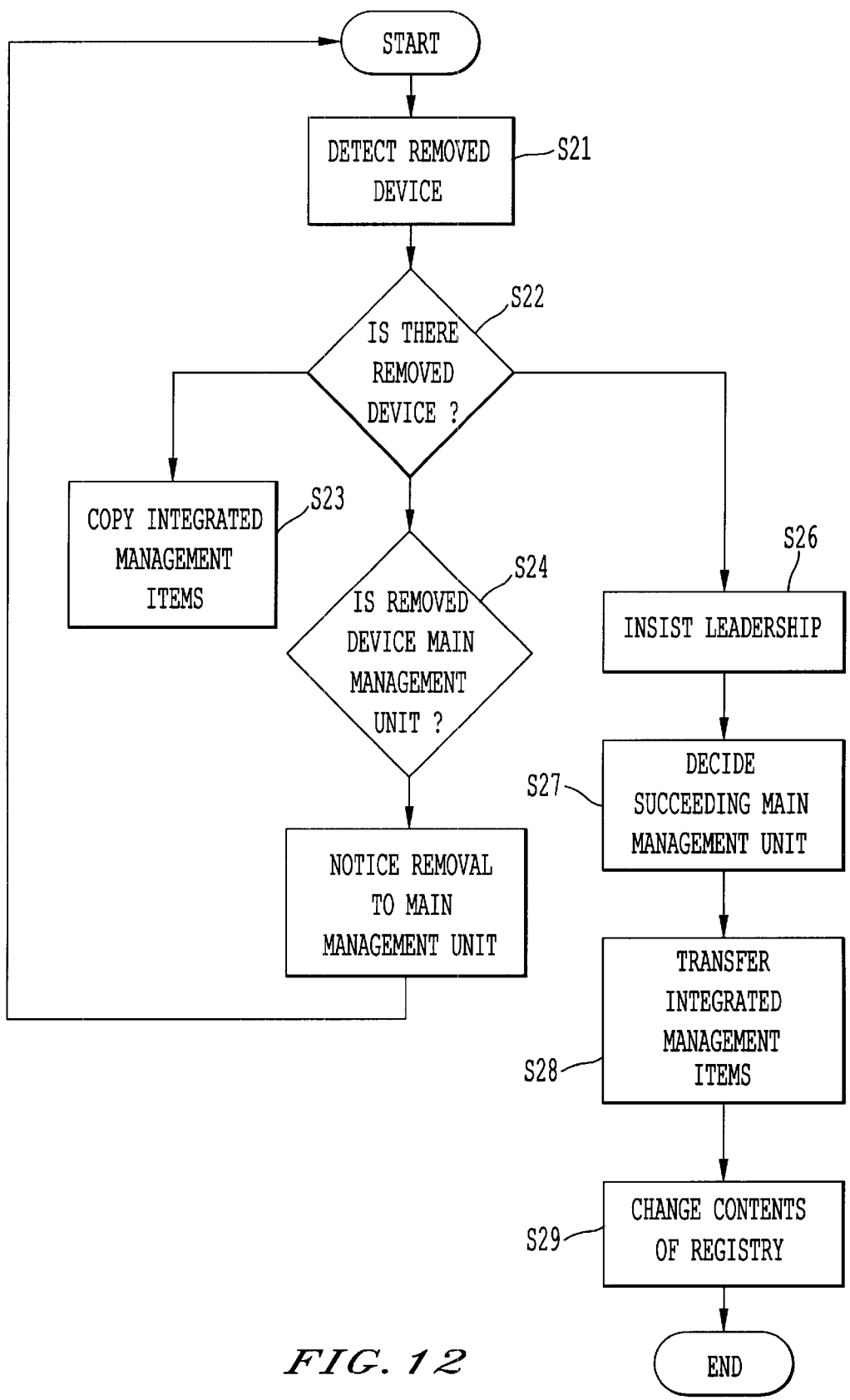

FIG; 4 is a block diagram showing a modification of the embodiment in FIG. 3;

FIGS. 5A to 5E are management information tables used in an operation of the embodiment shown in FIG. 3;

FIG. 6 is a schematic showing still another embodiment of the present invention in which continuous integrated management is performed even when a device is added to the network;

FIG. 7 is another schematic showing a variation of the embodiment in FIG. 6;

FIG. 8 is a flowchart illustrating the steps performed by the network management integrated apparatus shown in the embodiment of FIGS. 6 and 7;

FIG. 9 is a schematic showing yet another embodiment of the present invention in which continuous integrated management is performed even when a device is removed from the network;

FIG. 10 is another schematic showing a variation of the embodiment in FIG. 9;

FIG. 11 is a flowchart illustrating the steps performed by the network management integrated apparatus of the embodiment shown in FIGS. 9 and 10; and FIG. 12 is another flowchart illustrating the steps performed by the network management integrated apparatus when a device is removed from the network.

DESCRIPTION OF THE PREFERRED EMBODIMENTS

Figure 1:
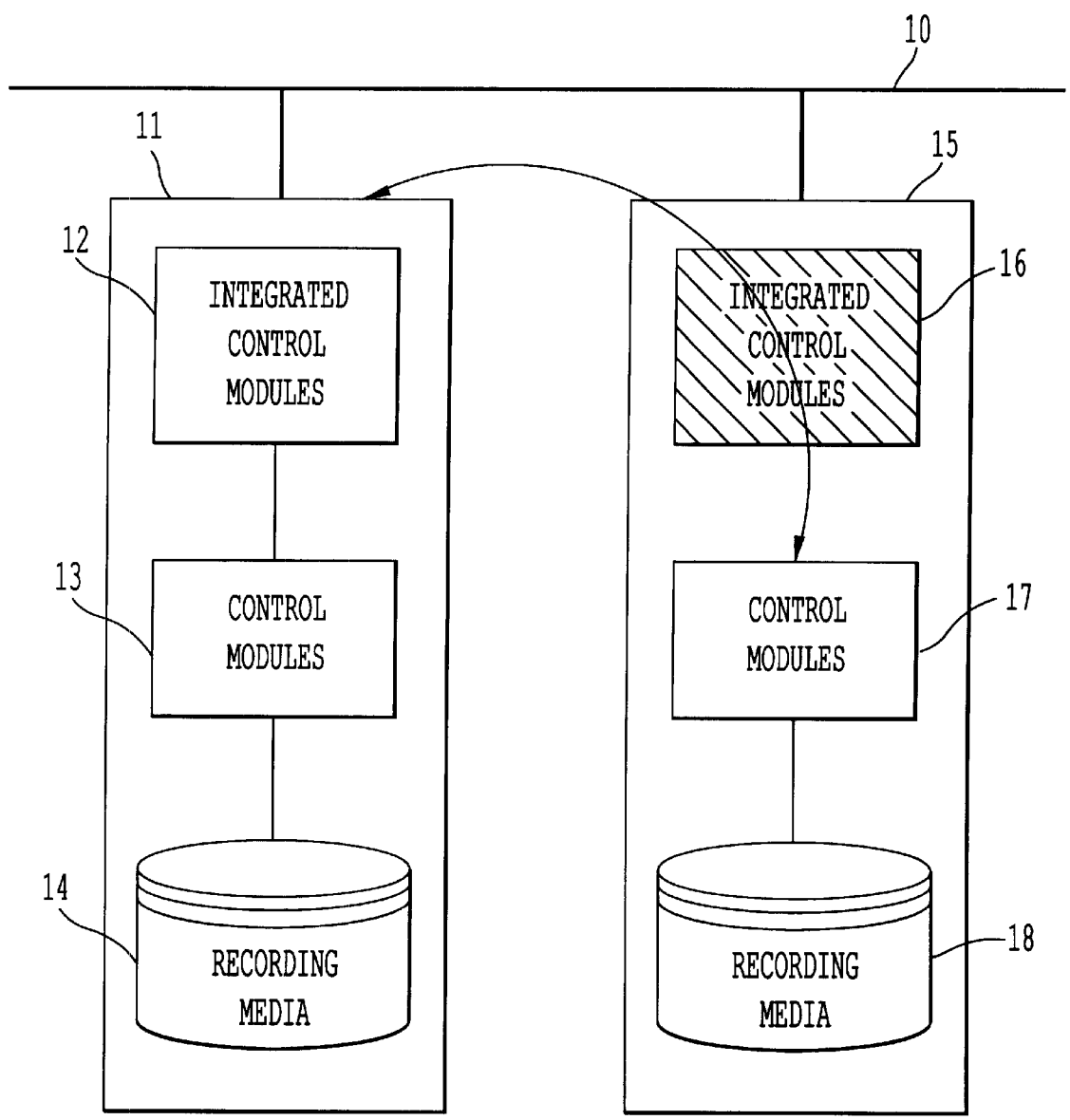
FIG. 1 is a block diagram showing one embodiment of an apparatus for network integrated management according to the present invention.

Preferred embodiments of the present invention will now be described in detail below with reference to the accompanying drawings, where FIG. 1 is a block diagram showing one embodiment of an apparatus for network integrated management according to the present invention.

In the embodiment shown in FIG. 1, a plurality of same type devices connected to a network are managed in an integrated manner. Thus, the user may simply manage the devices without knowing the devices are separate from each other.

Referring to FIG. 1, network integrated management apparatuses 11, 15 are connected to a bus 10, and have a similar configuration. The management apparatuses 11, 15 respectively include integrated control modules 12, 16, control modules 13, 17 and recording media 14, 18. The recording media 14, 18 and the control modules 13, 17 are selected based on the devices in which the apparatuses 11, 15 are incorporated.

Figure 2:
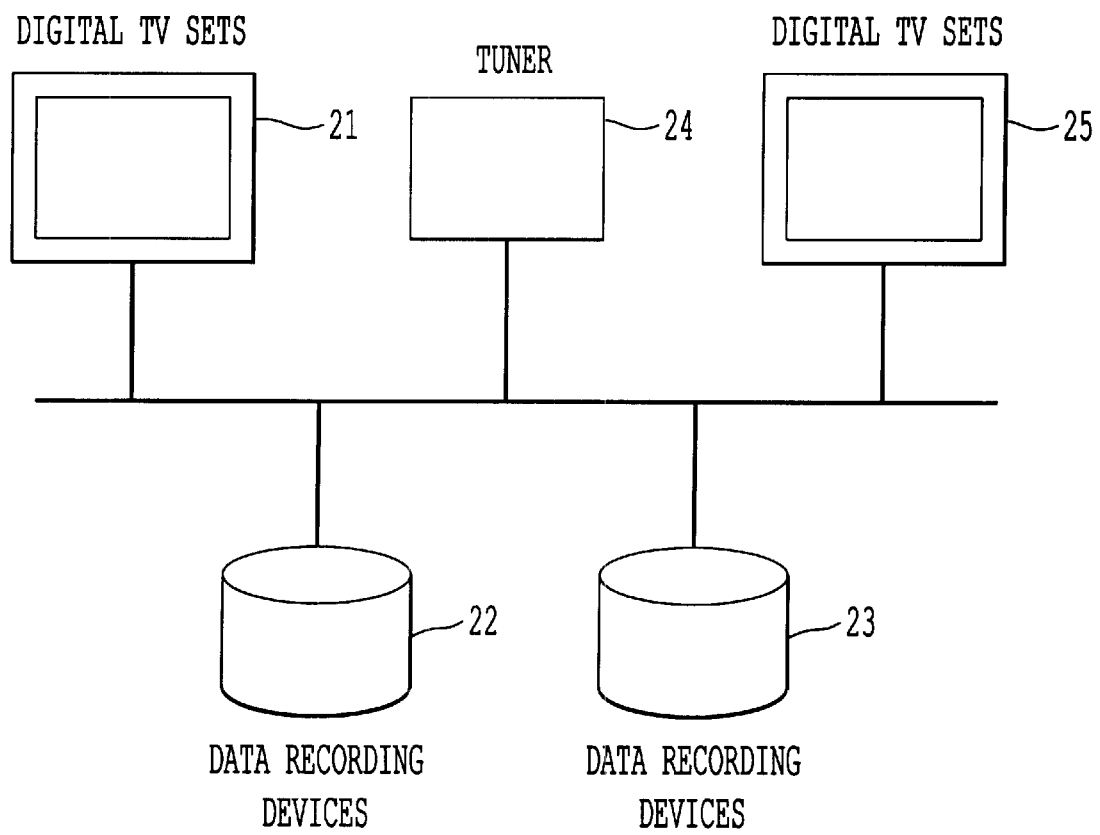
FIG. 2 is a schematic of a network system for use with the apparatus for network integrated management apparatus according to the embodiment shown in FIG. 1.

Referring to FIG. 2, a plurality of devices 21 to 25 are connected to a predetermined bus 10. A management apparatus, such as the management apparatuses 11, 15 shown in FIG. 1, are incorporated into each of the devices 21 to 25. The devices 22, 23 are data recording devices which may record and reproduce data, the devices 21, 25 are digital TV sets for receiving and displaying a TV broadcast, and the device 24 is a tuner for receiving broadcast signals.

In FIGS. 1 and 2, the bus 10 and respective nodes (i.e., locations where the bus 10 connects to the respective devices) are physically and logically interconnected in accordance with a predetermined network standard. This embodiment is applicable to any one of various network standards, such as IEEE 1394. Stated otherwise, the network in this embodiment securely maintains physical continuation in accordance with the network standard and protocol represented by IEEE 1394, and permits devices to be freely added to, or removed from the network within the bounds specified by the network standard and protocol.

In addition, the management apparatuses 11, 15 shown in FIG. 1 may be incorporated in devices handling various types of data. The bus 10 transmits various types of data, such as broadcasting programs, packaged software data including music CDs, and video data, images, etc., in a digital or analog manner.

The recording media 14, 18 each include any one of a magnetic tape, various disk media, a non-volatile memory, a hard disk, and so on. When the management apparatuses 11, are incorporated in VCRs, for example, the recording media 14, 18 are magnetic tapes.

The control modules 13, 17 control, for example, the operations including recording data on, and reproducing data from the recording media 14, 18. In this embodiment, the control modules 13, 17 may record information corresponding to the recording made on the recording media 14, 18. Also, when the recording media 14, 18 are removable media, the control modules 13, 17 may read information corresponding to the recording operation and prepare a local management table when the recording media 14, 18 is loaded into the device.

For example, when the recording medium is a cassette tape, information corresponding to the recording may be magnetically recorded on the tape, or may be stored in a memory provided in the cassette.

Rather than recording the information corresponding to the recording operation on the recording media 14, 18, the control modules 13, 17 may store the information in memories (not shown) or the like. In this case, if the recording media 14, 18 are removable media, information may be stored correlating the removable media and the information regarding the recording operation.

In this embodiment, the integrated control modules 12, 16 manage the devices connected to the bus 10. That is, integrated control modules 12, 16 mutually communicate with each other via the bus 10 to decide which one of the integrated control modules will function a main management unit for managing devices, which are of the same type, within the network in an integrated manner. Obviously, the main management unit may be decided by another function included in the network.

Of the integrated control modules 12, 16, the module functioning as the main management unit contained within one of the same type of devices, such as recording devices, communicates with other same type devices on the network so as to control the devices in an integrated manner. For example, when the same type devices are recording devices, the integrated control module functioning as the main management unit controls the recording devices in the network so that data may be recorded in succession.

Also, the integrated control module functioning as the main management unit may read local management tables from the control modules 13, 17 of the respective devices, and may prepare an integrated management table including integrated management information. The integrated management information is based on information corresponding to recordings made on recording media loaded in the respective devices connected to the network. Using the integrated management information, the main management unit may continuously reproduce, for example, data of one program recorded on a plurality of recording media by controlling the control modules of the respective devices.

Further, the main management unit may output information regarding the recording operation to the control modules 13, 17 of the respective devices. As described above, the control modules 13, 17 of the respective devices may write the information from the main management unit on the recording media 14, 18.

For example, when a program is recorded on a plurality of recording media, the integrated control module functioning as the main management unit controls the control modules 13, 17 of the respective devices to record the program in succession, and simultaneously controls the control modules 13, 17 to record information regarding the recording operation performed by the control modules 13, 17. With the above control, in a reproduction mode, the control modules 13, 17 may prepare local management tables, and the main management unit may prepare an integrated management table based on the local management tables. Therefore, data may be handled in physical or logical units (i.e., units of a program).

In addition, the main management unit may store the integrated management table in a memory (not shown). In this case, a correlation between the information regarding the recording operation and the control modules (devices) may be stored in the memory.

Further, the main management unit may realize not only the recording and reproduction of data, but also other various functions under cooperated control of the respective devices by communicating with the control modules provided in the respective devices within the network.

An operation of this embodiment will now be described.

Assume that the network integrated management apparatuses 11, 15 are incorporated in data recording devices connected to the bus 10. In this case, it may be determined that the network integrated management apparatuses 11, 15 are incorporated in data recording devices by communication between the integrated control modules 12 and 16. Further, the integrated control module 12, for example, may be chosen as the main management unit. A hatched portion in FIG. 1 implies that the integrated control module 16 is not functioning as a main management unit (i.e., the integrated module 12 is functioning as the main management unit).

In this instance, the integrated control module 12 manages the control modules 13, 17 (which control the individual data recording devices) in an integrated manner, thereby providing a necessary function to an application. The main management unit 12 controls not only the control module 13 in its own device, but also the control module 17 in another data recording device operating in a dependent relation.

Of all the devices in the network, those which may be managed by the integrated control module 12 are the same type of device having a similar data management scheme as the device having the integrated control module 12. For example, assume management apparatuses 11, 15 are respectively incorporated in the data recording devices 22, 23. Also, assume a program recorded and preserved in the network system is reproduced using the digital TV set 21 shown in FIG. 2. In this scenario, the user is not required to know in which one of the data recording devices 22, 23 the desired program is stored. Further, the user is not required to know in which position of a recording medium the desired program is recorded. Stated otherwise, the user is not required to obtain information, such as information regarding the individual devices in the network, information regarding recording media inserted into the devices, etc., or separately operate the individual devices to reproduce data from the recording media. Thus, the user need only select e.g., using an input device (not shown), the desired program.

The control modules 13, 17 incorporated in the respective data recording devices 22, 23 read information regarding the recording operation from the recording media 14, 18 loaded in the data recording devices 22, 23, respectively, and prepare local management tables. The integrated control module 12 may then read the local management tables from the control modules 13, 17, and prepare an integrated management table.

When the user designates a reproduction of a program, the integrated control module 12 may determine, from the integrated management table, which recording media (i.e., which data recording devices), the program is recorded on, in which position of the recording medium the program is recorded, and the times to start reproduction of data from the respective media.

The integrated control module 12 (functioning as the main management unit) may then control the respective control modules based on the integrated management table to reproduce the program desired by the user. For example, when a program, of which reproduction is desired by the user, is recorded on the recording media 14, 18 respectively loaded in the data recording devices 22, 23, the control modules 13, 17 are controlled by the integrated control module 12 to reproduce the program in a cooperating manner.

As a result, even when a program is recorded on a plurality of recording media, the user may reproduce the program with a simple operation. Also, when starting to record data, the user is not required to know such information as how much vacant area remains in which recording medium, and the data may be recorded in an appropriate position of an appropriate recording medium under control of the integrated control module 12. Incidentally, an appropriate recording device, recording medium and recording position may also be designated with an input operation by the user.

With this embodiment, as described above, because the devices in the network are controlled by the integrated control module 12 in a integrated manner, the devices may be employed in a cooperating manner with a simple operating process. Further, information regarding the recording operation (i.e., the device and the recording medium which are used to record the data), may be recorded on the recording medium. Thus, this information may be read from all of the recording medium loaded in the devices within the network to prepare respective local management tables and an integrated management table. Based on these tables, a program recorded on one or several recording media may be easily reproduced with a simple user operation (i.e., by just selecting the program), with no need to consider the reproducing device, the recording position in the recording medium, and so on.

In addition, the devices connected to the network include a same network interface or can maintain mutual continuation through adaptors. Further, the devices illustrated as independent devices may be physically provided in a single housing in plural numbers while the devices are independent of each other from a functional point of view. FIG. 3 is a block diagram showing another embodiment of the present invention. In an illustrated example of this embodiment, the network integrated management apparatuses 11, 15 shown in FIG. 1 are each applied to a data recording device.

Referring to FIG. 3, a data recording device 30 includes a data transmitting/receiving unit 32, a management interface unit 33, a local data management unit 34, a data recording unit 35, and an integrated data management unit 36. The integrated data management unit 36 and the local data management unit 34 respectively correspond to the integrated control modules 12, 16 and the control modules 13, 17 shown in FIG. 1.

Various types of data are transmitted via the bus 10. The data transmitting/receiving unit 32 transmits and receives this various type of data to and from the bus 10. Assume another data recording device having the same configuration as the data recording device 30 is connected to the bus 10, and the data recording device 30 manages all of the same type devices including itself. In other words, the integrated data management unit 36 (included in the data recording device 30) serves as a main management unit.

The integrated data management unit 36 operates a management application, which may also be operated in the other data recording devices in addition to the data recording device 30. The integrated data management unit 36 sends the management application to the other data recording devices through the data transmitting/receiving unit 32 so that the management application may also operate there. Thus, the integrated data management unit 36 may control the same type of devices in the network.

The management interface unit 33 provides a user interface such as a Graphic User Interface (GUI). The management interface unit 33 may control the data transmitting/receiving unit 32 and the integrated data management unit 36.

In addition, the management application may be remotely operated from another device. In this case, the integrated data management unit 36 receives a control module necessary for remote control from the management interface unit 33, and operates the management application by remote control of the other device.

The local data management unit 34 controls the recording and reproducing operation of the data recording unit 35 in its own device under control of the integrated data management unit 36. The data recording unit 35 records information input via the data transmitting/receiving unit 32 on a predetermined recording medium, and reproduces information recorded on the recording medium. Then, the data recording unit 35 may output the reproduced information to the data transmitting/receiving unit 32.

Figure 4:
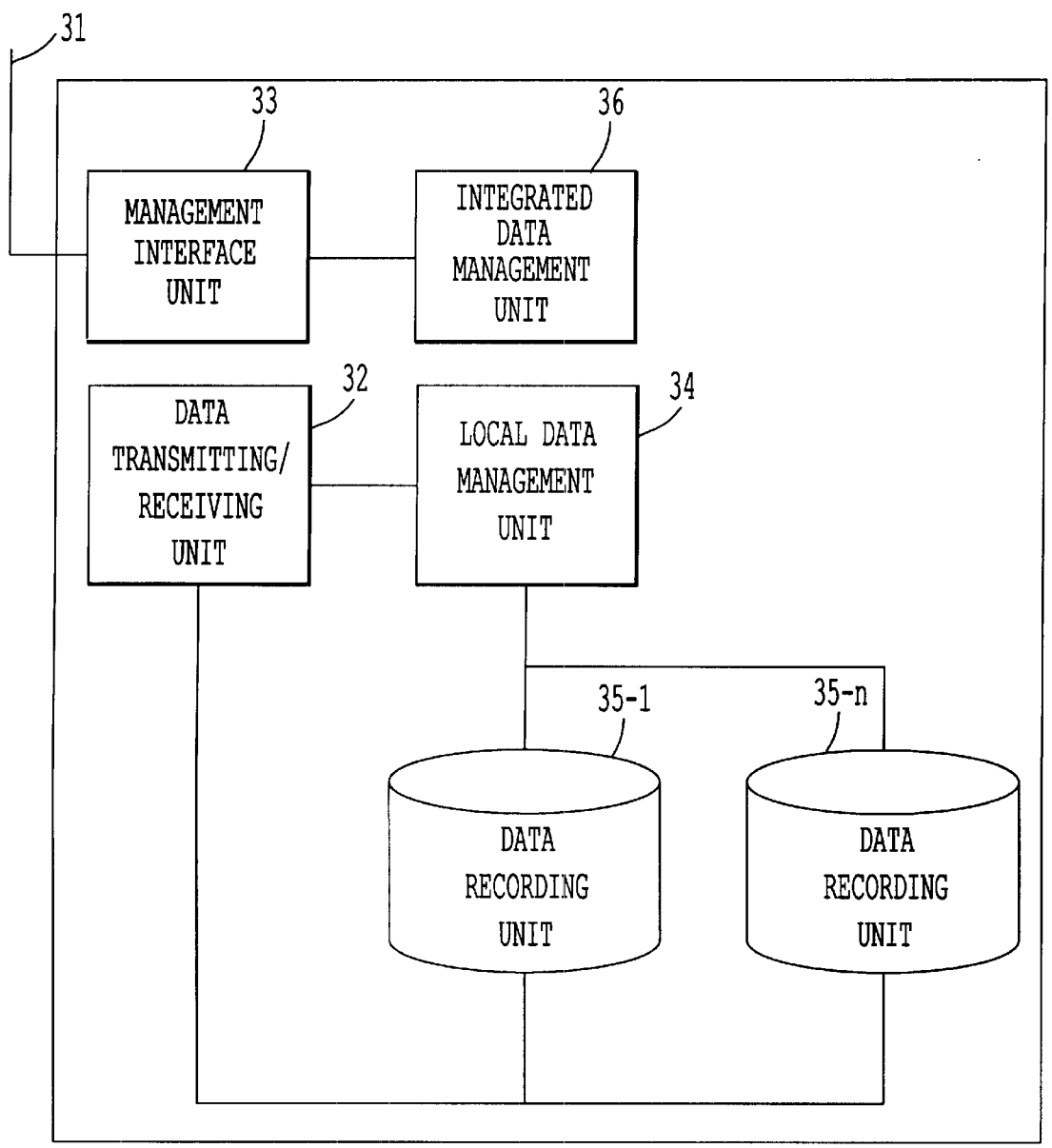

FIG. 4 shows an example in which the data recording device includes a plurality of data recording units 35-1 to 35-n. The data recording units 35-1 to 35-n each have the same configuration as the data recording unit 35. Further, the local data management unit 34 may control the data recording units 35-1 to 35-n in an integrated manner.

In this embodiment, too, the local data management unit 34 may record information corresponding to the recording operation for each of the recording media when data is recorded on one or more recording media loaded in one data recording unit 35 or several of the data recording units 35-1 to 35-n. The local data management unit 34 may also prepare a local management table by reading the information regarding the recording operation recorded on each of the loaded recording media.

The integrated data management unit 36 outputs, in a recording mode, information corresponding to the recording operation (which indicates a correlation between the recorded program and the recording device, the recording medium, the recording position, etc.) to the local data management unit 34 in each device, and prepares, in a reproducing mode, an integrated management table by reading the local management data from the local data management unit 34.

Figures 5A, 5B, 5D:
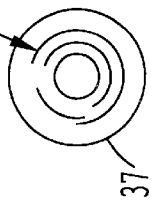

The operation of this embodiment will now be next described with reference to FIGS. 5A to 5E. FIG. 5A shows an integrated management table, FIGS. 5B and 5C show local management tables, and FIGS. 5D and 5E show recording positions in recording media at which a designated program is recorded.

Assume that a plurality of devices are connected to the network, and the data recording device 30 manages the same type of recording devices. In other words, the integrated data management unit 36 in the data recording device 30 serves as a main management unit. Also assume that the user operates the management interface unit 33 and instructs the recording of an economic news broadcast on channel 11 from 19:00 to 19:30 on Jun. 20, 1998.

The information corresponding to the recording operation made on the recording medium loaded in each of the devices connected to the network is read by the local data management unit 34 in each device. Based on the read information, the local data management unit 34 prepares a local management table. The local management table indicates what data is recorded in which position of the recording medium loaded in each data recording unit. Incidentally, a recording medium, on which information regarding the recording is not recorded, is handled as not containing recorded information.

Further, the integrated data management unit 36 communicates with the local data management unit 34 in each device and prepares an integrated management table by reading each local management table. Based on the prepared integrated management table, the integrated data management unit 36 recognizes information corresponding to the recording medium loaded in each device (e.g., recording time available, etc.).

Upon reaching a recording start time of a program designated by the user, the integrated data management unit 36 or another management unit controls a set-top box or the like (not shown) connected to the network to start receiving the program on channel 11. The integrated data management unit 36 also transfers the received data to the data recording device loading therein on the recording medium determined to be used for recording the data. Further, the user may designate the recording medium to be used for recording the data.

Assuming the program on channel 11 is recorded in the data recording device 30, and a data stream of the program is received by the data transmitting/receiving unit 32 and supplied to the data recording unit 35. On the other hand, the integrated data management unit 36 controls the local data management unit 34 in its own device to start recording the received program on channel 11.

In this case, the integrated data management unit 36 includes an ID (program ID), which is specific in the network, to the program to be recorded and sets a pointer corresponding to the program ID indicating in which recording device (local data management unit) and in which recording medium the program is recorded. In the example of FIG. 5, for instance, each pointer in the integrated management table includes eight digits, two higher-order digits indicating the local management unit and six lower-order digits indicating an item in the local management table. When one program is recorded on a plurality of recording media, a plurality of pointers indicating the plurality of recording media are set for one program ID. In this case, information indicating a sequence of the pointers is also described.

The local data management unit 34 controls the data recording unit 35 to record the program on channel 11 on the recording medium, and simultaneously records information regarding a correlation between the pointer indicating the recording medium in its own device and the recording position therein.

When one program needs to be recorded on a plurality of recording media, the integrated data management unit 36 controls the recording devices used for recording the program on the respective recording media successively to perform the recording in a cooperating manner. At the same time, information corresponding to the recording of the program is recorded on each of the recording media.

In addition, in the reproducing mode, the local management table may be prepared by the local data management unit 34 in each device and the integrated management table may be prepared by the integrated data management unit 36. Thus, the recording position in the recording medium may be decided by the local data management unit 34. Further, any other suitable method may also be employed to record, on the recording medium, the pointer indicating the program ID, the recording device and the recording medium, as well as information regarding the recording position, etc.

It is assumed that recording media 37, 38 shown in FIG. 5 are respectively loaded in the data recording units 35-1, 35-2 shown in FIG. 4. The local data management unit 34 prepares local management tables, shown in FIGS. 5B and 5C, for the recording media 37, 38. Based on the local management tables, the integrated data management unit 36 prepares an integrated management table shown in FIG. 5A.

Suppose now that the user instructs a reproduction of the economic news recorded on the recording medium 37, by, for example, issuing a reproduction request from a device on the network. The reproduction request is transmitted to the integrated data management unit 36 serving as the main management unit. By referring to the integrated management table, the integrated data management unit 36 may obtain information corresponding to the recording medium on which the program is recorded, and the data recording unit in which that recording medium is loaded.

In the example of FIG. 5, the program requested to be reproduced by the user has the program ID "26579" (see FIG. 5A). The integrated data management unit 36 detects that the pointer associated with the program ID is "01120250" and determines the local data management unit and the recording medium based on the pointer. The integrated data management unit 36 outputs the detected pointer to the corresponding local data management unit 34, and performs a control operation to start reproduction of the program.

Under control of the integrated data management unit 36, the local data management unit 34 reads the recording position on the recording medium 37 from the local management table and controls the data recording unit 35 to start reproduction of the program from the read recording position. Thus, the user may reproduce a program with a simple operation (i.e., by just designating the program to be reproduced, with no need of knowing the information regarding the recording medium on which the program to be reproduced is recorded, and so on).

Because the integrated data management unit 36 controls all of the same type devices within the network in an integrated manner, a program designated to be reproduced may be reproduced by just designating the program, without separately operating each device, etc. Also, for a program recorded on a plurality of recording media (i.e., in a case in which there are a plurality of pointers indicating one program), because the sequence relation between the pointers is also described in the integrated management table as mentioned above, the program recorded on the plurality of recording media may be reproduced without interruption by outputting the next pointer to the corresponding local data management unit before a predetermined period of time from the end of the preceding reproduction process.

Consequently, this embodiment also provides similar advantages as obtainable with the embodiment of FIG. 1.

FIGS. 6 and 7 are schematics showing still another embodiment of the present invention. This embodiment illustrates a continuous integrated management operation even when a new device is added to the network. In particular, FIG. 6 is a diagram for explaining an integrated management method executed when the integrated data management unit is present in a data recording device, and FIG. 7 is a diagram for explaining an integrated management operation executed when the integrated data management unit is outside a data recording device.

Each of data recording devices 51A, 52A, 51B, 52B, 61A, 61B, 62A and 62B shown in FIGS. 6 and 7 has the same configuration as shown in FIG. 3. However, a management application used in the integrated data management unit in this embodiment differs from that used in the embodiment of FIG. 3.

This embodiment includes UI devices 50A, 50B, 60A and 60B. The UI devices 50A, 50B, 60A and 60B provide user interfaces, and may include for example, a receiving unit of a remote control device. In other words, the UI device may be constructed using each device, e.g., a TV set, connected to the network.

This embodiment employs a network system including a management mechanism configured to recognize the device arrangement in the network, such as a registry. The management mechanism is present in single or plural numbers in the form of an independent device or a software module operating on the device which may realize the equivalent function. A registry may be, for example, a memory location which includes a plurality of information corresponding to devices on the network, etc.

The operation of the embodiment will now be described with reference to the flowchart of FIG. 8.

Assume that a new data recording device 52A is added to the network to which the data recording device 51A is connected. The data recording device 52A may be added to the network by, for example, inserting a plug or coupling a connector for the network interface with the data recording device powered on. Alternatively, the device 52A may be added by simply turning on the power of the device if it is already physically connected to the network. The device may also be added by using a software application, which allows a user to "enable" a device physically connected to the network.

When the data recording device 52A is added to the network, the local data management unit starts operation of the data recording unit (see FIG. 3) contained in the data recording device 52A (step S1). Then, in step S2, the local data management unit refers to the registry. Based on information contained in the registry, the local data management unit may determine whether there are the same type of devices in the network (step S3). If the registry indicates that the same type device as the data recording device 52A does not exist in the network (NO in step S3), the data recording device 52A is registered in the registry (step S4).

Assume, in the example of FIG. 6, the data recording device 51A is of the same type of device as the data recording device 52A already present in the network (i.e., YES in step S3). The, the processing shifts to step S5. In step S5, it is determined whether the data recording device 52A is to become a main management unit. As with the embodiment of FIG. 3, the main management unit is an integrated data management unit in the data recording device, and manages data in the network in accordance with a management application set in the integrated data management unit of the data recording device, or the management application itself.

Whether the data recording device 52A becomes a main management unit is comprehensively determined based on one or a combination of several variables, including an allowable capacity for accommodating the integrated data management unit, a version of a management data module, and the rule otherwise specified beforehand. If it is determined that the data recording device 52A cannot become a main management unit and is subordinate to the existing main management unit in the network (NO in step S5), the processing shifts from step S5 to S6. In step S6, the procedure for subordination to the main management unit (e. g., the integrated data management unit in the data recording device 51A) is executed.

The subordination procedure is executed by sending a management application module in the integrated data management unit of the data recording device 52A to the management application module in the main management unit. In this example, the subordination procedure is mainly divided into two cases shown in FIGS. 6 and 7.

FIG. 6 shows the case in which the management application is already operating in the integrated data management unit of the data recording device 51A and the data recording device 52A is newly added to such a situation. When the data recording device 52A is subordinate to the integrated management by the existing main management unit, a management application module 54A in the data recording device 52A is sent to a management application module 53A in the main management unit via the network bus.

In addition, an integrated data management unit in the data recording device 51B accepts a management application module 54B and starts operation in harmony with a management application module 53B already operating therein.

On the other hand, FIG. 7 shows the case in which the management application is already operated in a program operating area of the device other than the data recording device (e.g., the UI device 60A), and the data recording device 62A is newly added to such a situation. When the data recording device 62A is subordinate to the integrated management by the existing main management unit, a management application module 64A in the data recording device 62A is sent to a management application module 63A in the main management unit via the network bus.

In addition, a program operating area in the UI device 60B accepts a management program module 64B and starts operation in harmony with a management application module 63B already operating therein.

When the subordination procedure in step S6 is completed, the processing ends without changing the contents of the registry. Thus, in this embodiment, the data recording device 52B, which has been subordinate to the integrated management by the existing main management unit, is not registered in the registry, and the user or another control means may operate (e.g., recording and reproduction of data) without being aware of an increase or decrease in the number of component devices.

On the other hand, when the integrated data management unit of the data recording device 52A becomes the main management unit (YES in step S5), the processing shifts to step S7 for transfer of the integrated management items. Stated differently, when the newly added data recording device 52A becomes the main management unit, the management program module is sent through a procedure reversed to the subordination procedure. That is, the integrated data management items having been handled by the preceding main management unit so far are transferred to the integrated data management unit or the management module of the new data recording device.

In step S8, the relationship between the main management and the subordinates is changed by the management program module which has started the harmonious operation. Then, the data recording device registered in the registry of the network system is changed to the integrated data management unit of the newly added data recording device 52A (step S9).

As a result, the data recording device on the network system is changed to the newly added data recording device 52A. The remaining operation (e.g., the main management unit monitoring the status of the integrated data management unit of the data recording devices as the subordinates) is similar to that in the embodiment of FIG. 3. Thus, with this embodiment, integrated control of the respective devices in the network may be achieved without interruption even when a new device is added to the network.

FIGS. 9 and 10 are schematics used to show yet another embodiment of the present invention. This embodiment prevents an interruption of the integrated management operation when a device is removed from the network. In particular, FIG. 9 is a diagram for explaining an integrated management method executed when the integrated data management unit is present in a data recording device, and FIG. 10 is a diagram for explaining an integrated management method executed when the integrated data management unit is present outside a data recording device.

Each of data recording devices 71A, 72A, 72B, 81A, 82A and 82B shown in FIGS. 9 and 10 has the same configuration as shown in FIG. 3. However, a management application used in the integrated data management unit in this embodiment differs from that used in the embodiment of FIG. 3. This embodiment also includes UI devices 70A, 70B, 80A and 80B.

This embodiment also employs a network including a management mechanism configured to recognize the device arrangement in the network, such as a registry. The management mechanism may be present in single or plural numbers in the form of an independent device or a software module operating on the device which can realize the equivalent function.

The operation of the embodiment will now be described with reference to a flowchart of FIG. 11.

Assume that the data recording device 71A is removed from the network to which the data recording device 72A is connected. The data recording device 71A may be removed from the network by disconnecting a plug or decoupling a connector for the network interface with the data recording device powered on, or by turning off the power of the data recording device which is in a physically connected state. The data recording device 71A may also be removed by disabling the device through a software application, for example. In this example, the data recording devices 71A, 72A are the same type of devices.

When the data recording device 71A in FIG. 9 is disconnected, local data management by the local data management unit 34 (see FIG. 3) of the device 71A is ended in step S11 of FIG. 11. Then, it is determined whether the removed device includes the integrated data management unit serving as the main management unit (step S12).

If the data recording device 71A is not the main management unit (NO in step S12), information indicating this removal is transmitted to the integrated data management unit or the management application serving as the main management unit in step S13, followed by a process of turning off the power of the device 71A or shifting the device 71A to a disconnected state in software fashion. Upon receiving the information, the main management unit no longer accesses the data recorded in the removed data recording device 71A.

If the data recording device 71A includes the integrated data management unit serving as the main management unit (YES in Step S12), a succeeding main management unit is decided in step S14 based on one or a combination of several variables, including the allowable capacity for accommodating the integrated data management unit, the version of a management data module, and the rule otherwise specified beforehand.

After the integrated data management unit or the management application serving as the main management unit is decided, a transfer procedure of the integrated management items is executed in step S15. After completing the transfer of the integrated management items, the contents of the registry are updated to correspond to the newly decided main management unit (step S16).

When a plurality of management application modules are functioning on the same device in harmony, the removal procedure of the device, i.e., the transfer procedure of the integrated management items, is mainly divided into two cases shown in FIGS. 9 and 10.

That is, FIG. 9 shows the case in which the management application is already operated in the integrated data management unit of the data recording device 71A and the data recording device 71A is removed from the network in such a situation. A management application 73A operating in the integrated data management unit belongs to the data recording device 71A, and a management application 74A also operating therein belongs to the data recording device 72A. Both the management applications 73A, 74A are operating in harmony with each other while the management application 73A serves as the main management unit.

When the removal procedure of the data recording device 71A begins, the integrated management items are transferred so that the integrated management is performed without interruption while the management application 73A continues to serve as the main management unit. Specifically, the transfer procedure of the integrated management items is executed in the integrated data management unit of the data recording device 71A, and upon completion of the transfer procedure, the management application 74A is transferred back to the integrated data management unit of the data recording device 72A, to which the management application 74A originally belongs, via the network bus.

Then, the registry is updated to indicate that the integrated data management unit is present in the data recording device 72B on the network. Then, the removal preparation of the data recording device 71 A from the network is completed.

FIG. 10 shows the case in which the management application is already operated in a program operating area of the device other than the data recording device (e.g., the UI device 80A) and the data recording device 81A is removed from the network in such a situation. A management application 83A operating in the integrated data management unit belongs to the data recording device 81A, and a management application 84A also operating therein belongs to the data recording device 82A. Both the management applications 83A, 84A are operating in harmony with each other while the management application 83A serves as the main management unit.

When the removal procedure of the data recording device 81A begins, the integrated management items are transferred in the program operating area of the UI device 80A so that the integrated management is performed without interruption while the management application 73A continues to serve as the main management unit. Upon completion of the transfer procedure, the management application 83A is transferred back to the integrated data management unit of the data recording device 71A, to which the management application 83A originally belongs, via the network bus. Transfer of the main management unit may also be performed by erasing the management application 84A from the program operating area of the UI device 80A.

Then, the registry is updated to indicate that the integrated data management unit of the data recording device 82B on the network is the main management unit. Thus, the removal preparation of the data recording device 81A from the network is completed. As a result, with this embodiment, an integrated control of the respective devices in the network may also be achieved without interruption even when some device is removed from the network.

FIG. 12 is a flowchart for explaining still another embodiment of the present invention.

Removal of some device from the network is not always performed after executing the above-described removal procedure. It may happen, for example, that the power of the data recording device is abruptly turned off, or that such physical disconnection as withdrawal of the plug or decoupling of the connector for the network interface takes place erroneously. In view of such a case, the embodiment of FIG. 12 intends to achieve continuous integrated data management by periodically backing up the integrated management items.

Assume that a plurality of data recording devices and other devices are connected to the network, and that data recorded in the data recording devices are managed in an integrated manner. In this embodiment, in step S21, removal of some data recording device is detected for each predetermined period. A data-recording-device removal detecting unit for detecting the removal of some data recording device is provided, for example, in the data recording device where the management application serving as the main management unit is operating, or in the data recording device other than the data recording device to which the management application belongs.

If the data-recording-device removal detecting unit is present in a plurality of data recording devices, these data-recording-device removal detecting units cooperate with each other. In step S22, it is determined whether any device has been removed. If there are no removed data recording devices, the contents of the integrated management items are copied to the integrated data management unit in step S23. The integrated data management unit to which the contents of the integrated management items are copied is not necessarily the main management unit, but may be the integrated data management unit provided in the data recording device other than that to which the management application belongs.

If any data recording device is removed from the network for some reason, the processing shifts from step S22 to S24 to determine whether or not the removed device is the data recording device including the integrated data management unit serving as the main management unit or the data recording devices to which the management application belongs. If the removed device is none of these data recording devices, the information indicating the removal is transferred to the main management unit in step S25, thereby ending the process.

If the data recording device in which the management application serving as the main management unit is operating is removed from the network, the processing shifts from step S14 into a procedure for transfer of the main management unit subsequent to step S26. On this occasion, if there are a plurality of data recording devices in which the data-recording-device removal detecting units are operating, the leader in a procedure for transfer of the main management unit is decided and instructed (step S26) in accordance with the data-recording-device removal detecting order or another suitable priority order.

The data-recording-device removal detecting unit having become the leader decides in step S27 the data recording device, in or to which the management application as the succeeding main management unit is operating or belongs, in accordance with a predetermined rule. Then, in step S28, the latest one of plural sets of the integrated management items copied and preserved individually so far is selected based on time stamps, etc., and is transferred to the management application as the succeeding main management unit. Finally, the information in the registry is changed to record the data recording device newly selected (step S29).

Thus, with this embodiment, even in the case of an abrupt physical disconnection (i.e., even when the power of the data recording device is cut off, or the plug or the connector for the network interface is withdrawal or decoupled), the integrated management may be continuously performed.

According to the present invention, as described above, by managing a plurality of devices connected to a network in an integrated manner, the devices may be used in a cooperating manner with a simple operating process. Also, because the devices connected to the network are managed in an integrated manner, even when data is recorded on a plurality of recording media and is managed in units of a recording stream, recording and reproduction of data using a plurality of devices may be performed with a simple operating process. Further, even when a new device is added to the network, all the devices including the new device can be managed in an integrated manner. In addition, even when some device is removed from the network, the devices in the network can be managed in an integrated manner.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for managing a plurality of devices connected together via a network, comprising:

a plurality of control units respectively provided in the plurality of devices, and configured to perform functions of the device and acquire information necessary to perform the functions; and at least one integrated control device provided on the network and configured to control the plurality of control units in devices having a same function in an integrated manner based on integrated management information read from the information acquired from the plurality of control units, wherein the at least one integrated control device includes a plurality of integrated control devices, and the plurality of integrated control devices mutually communicate with each other to decide which one of the plurality of integrated control devices will function as a main management unit, the main management unit being solely responsible for controlling the plurality of control units.

2. The apparatus according to claim 1, further comprising:

a mechanism configured to determine that a number of the plurality of integrated control devices has increased when a new device is added to the network, and one of the plurality of integrated control devices, including an integrated control device provided in the newly added device, is designated as the main management unit.

3. The apparatus according to claim 2, wherein management information held by the main management unit prior to the new device being added to the network is transferred to the newly designated integrated control device.

4. The apparatus according to claim 1, further comprising:

a mechanism configured to determine that a number of the plurality of integrated control devices has decreased when a device is removed from the network, and one of the plurality of integrated control devices, excluding the integrated control device removed from the network, is designated as the main management unit.

5. The apparatus according to claim 4, wherein management information held by the main management unit is updated to reflect that the device has been removed from the network.

6. The apparatus according to claim 1, wherein the integrated management information comprises a table including information corresponding to data transferred over the network and physical components of the devices on the network to which the data is to be transferred.

7. The apparatus according to claim 6, wherein the table includes 1) at least one program ID, and 2) pointer variables corresponding to positions of the physical components.

8. The apparatus according to claim 6, wherein the table includes information regarding positions in a recording medium for which recording is controlled by the plurality of control units.

9. The apparatus according to claim 1, wherein each of the plurality of devices having the same function is a VCR.

10. A method for managing a plurality of devices connected together via a network, comprising:

acquiring information, by a plurality of control units respectively provided in the plurality of devices, for operating the plurality of devices;

reading, by at least one integrated control device provided on the network, the acquired information to prepare integrated management information; and controlling the plurality of control units based on the integrated management information read from the information acquired from the plurality of control units so as to control the operations of the devices in an integrated manner, wherein the at least one integrated control device includes a plurality of integrated control devices, and the plurality of integrated control devices mutually communicate with each other to decide which one of the plurality of integrated control devices will function as a main management unit, the main management unit being solely responsible for controlling the plurality of control units.

11. The method according to claim 10, comprising:

determining a number of the plurality of integrated control devices to have increased when a new device is added to the network; and designating one of the plurality of integrated control devices, including an integrated control device provided in the newly added device, as the main management unit.

12. The method according to claim 11, comprising:

transferring management information held by the main management unit prior to the new device being added to the network to the newly designated integrated control device.

13. The method according to claim 10, comprising:

determining a number of the plurality of integrated control devices to have decreased when a device is removed from the network; and designating one of the plurality of integrated control devices, excluding the integrated control device removed from the network, as the main management unit.

14. The method according to claim 13, comprising:

updating management information held by the main management unit to reflect that the device has been removed the network.

15. The method according to claim 10, wherein the integrated management information comprises a table including information corresponding to data transferred over the network and physical components of the devices on the network to which the data is to be transferred.

16. The method according to claim 15, wherein the table includes 1) at least one program ID, and 2) pointer variables corresponding to positions of the physical components.

17. The method according to claim 15, wherein the table includes information regarding positions in a recording medium for which recording is controlled by the plurality of control units.

18. The method according to claim 10, wherein each of the plurality of devices having the same function is a VCR.

19. A system for managing a plurality of devices connected together via a network, comprising:

means for acquiring information, by a plurality of control units respectively provided in the plurality of devices, for operating the plurality of devices;

means for reading, by at least one integrated control device provided on the network, the acquired information to prepare integrated management information; and means for controlling the plurality of control units based on the integrated management information read from the information acquired from the plurality of control units so as to control the operations of the devices in an integrated manner, wherein the at least one integrated control device includes a plurality of integrated control devices, and the plurality of integrated control devices mutually communicate with each other to decide which one of the plurality of integrated control devices will function as a main management unit, the main management unit being solely responsible for controlling the plurality of control units.

20. The system according to claim 19, comprising:

means for determining a number of the plurality of integrated control devices to have increased when a new device is added to the network; and means for designating one of the plurality of integrated control devices, including an integrated control device provided in the newly added device, as the main management unit.

21. The system according to claim 20, comprising:

means for transferring management information held by the main management unit prior to the new device being added to the network to the newly designated integrated control device.

22. The system according to claim 19, comprising:

means for determining a number of the plurality of integrated control devices to have decreased when a device is removed from the network; and means for designating one of the plurality of integrated control devices, excluding the integrated control device removed from the network, as the main management unit.

23. The system according to claim 22, comprising:

means for updating management information held by the main management unit to reflect that the device has been removed from the network.

24. The system according to claim 19, wherein the integrated management information comprises a table including information corresponding to data transferred over the network and physical components of the devices on the network to which the data is to be transferred.

25. The system according to claim 24, wherein the table includes 1) at least one program ID, and 2) pointer variables corresponding to positions of the physical components.

26. The system according to claim 24, wherein the table includes information regarding positions in a recording medium for which recording is controlled by the plurality of control units.

27. The system according to claim 19, wherein each of the plurality of devices having the same function is a VCR.

* * * * *